(12) United States Patent
Monk et al.

(10) Patent No.: US 6,669,208 B1
(45) Date of Patent: Dec. 30, 2003

(54) PRESSURE COMPENSATION IN HYDRAULIC VEHICLE SUSPENSION SYSTEMS

(75) Inventors: Richard Monk, Dunsborough (AU); John Carrico, Yallingup (AU); Michael Longman, Dunsborough (AU)

(73) Assignee: Kinetic Pty., Ltd., Dunsborough (AU)

( * ) Notice: Subject to any disclaimer, the term of this patent is extended or adjusted under 35 U.S.C. 154(b) by 0 days.

(21) Appl. No.: 10/088,663

(22) PCT Filed: Sep. 20, 2000

(86) PCT No.: PCT/AU00/01132

§ 371 (c)(1), (2), (4) Date: Jul. 10, 2002

(87) PCT Pub. No.: WO01/21423

PCT Pub. Date: Mar. 29, 2001

(30) Foreign Application Priority Data

Sep. 20, 1999 (AU) .............................................. PQ2948

(51) Int. Cl.[7] .............................................. B60G 21/06
(52) U.S. Cl. ............................... 280/5.506; 280/5.508; 280/124.158
(58) Field of Search .......................... 280/5.506, 5.508, 280/124.157, 124.158, 124.106

(56) References Cited

U.S. PATENT DOCUMENTS

| | | | |
|---|---|---|---|
| 4,606,551 A | | 8/1986 | Toti et al. |
| 4,844,506 A | * | 7/1989 | Moriguchi et al. ........ 280/5.51 |
| 5,149,131 A | | 9/1992 | Sugasawa et al. |
| 5,269,556 A | * | 12/1993 | Heyring ................... 280/5.508 |
| 5,447,332 A | * | 9/1995 | Heyring ................ 280/124.104 |
| 5,480,188 A | | 1/1996 | Heyring |
| 5,529,324 A | * | 6/1996 | Krawczyk et al. ..... 280/124.106 |
| 5,601,306 A | * | 2/1997 | Heyring ................... 280/5.508 |
| 5,794,966 A | * | 8/1998 | MacLeod ................. 280/5.507 |
| 6,010,139 A | * | 1/2000 | Heyring et al. ........ 280/124.104 |
| 6,296,235 B1 | * | 10/2001 | Dalal ....................... 267/64.16 |
| 6,302,417 B1 | * | 10/2001 | Heyring ................ 280/124.106 |
| 6,519,517 B1 | * | 2/2003 | Heyring et al. ................ 701/37 |

FOREIGN PATENT DOCUMENTS

| WO | 95/23076 | 8/1995 |
|---|---|---|
| WO | 00/30881 | 6/2000 |

OTHER PUBLICATIONS

International Search Report—PCT/AU00/01132—Australian Patent Office, Oct. 31, 2000.

* cited by examiner

*Primary Examiner*—Yvonne Abbott
(74) *Attorney, Agent, or Firm*—Harness, Dickey & Pierce, PLC (57) ABSTRACT

A hydraulic system for a vehicle suspension, the hydraulic system being a portion of a roll control component of the vehicle suspension, the hydraulic system including a front hydraulic ram, a rear hydraulic ram, a first hydraulic volume extending, in use, between a first chamber of the front hydraulic ram and a first chamber of the rear hydraulic ram, a second hydraulic volume extending, in use, between a second chamber of the front hydraulic ram and a second chamber of the rear hydraulic ram, at least one accumulator in fluid communication with at least one hydraulic volume, and a fluid flow restrictor adapted to restrict the rate of fluid flow between the at least one accumulator and the corresponding at least one hydraulic volume during cornering of the vehicle.

13 Claims, 4 Drawing Sheets

PRESSURE COMPENSATION IN HYDRAULIC VEHICLE SUSPENSION SYSTEMS

This application is a 371 of PCT/AU00/01132 filed Sep. 20, 2000, which claims the benefit of application PQ 2948 filed in Australia on Sep. 20, 1999.

The present invention relates to pressure compensation in hydraulic vehicle suspension systems.

In vehicle suspension systems, it is often desirable to provide a relatively high roll stiffness so that the attitude of a vehicle equipped with the system remains relatively stable during cornering. It is also often desirable to provide a relatively low cross-axle articulation stiffness so that as the vehicle traverses uneven terrain wheels of the vehicle are permitted to articulate and thereby substantially maintain equal loading on the wheels. These characteristics are especially important for vehicles which have high roll moments, including most all-wheel drive off-road vehicles and all trucks.

A passive suspension system is disclosed in International Patent Application WO 97/06971. Referring specifically to FIGS. 5 to 13 which show suspension systems utilising hydraulic interconnections, a left front wheel of a vehicle is operatively associated with a piston of a front double acting hydraulic ram, a right front wheel of the vehicle is operatively associated with a cylinder of the front hydraulic ram, a left rear wheel of the vehicle is operatively associated with a piston of a rear double acting hydraulic ram, and a right rear wheel is operatively associated with a cylinder of the rear hydraulic ram. Chambers of the front hydraulic ram are connected to corresponding chambers of the rear hydraulic ram by fluid links so as to form a hydraulic circuit comprising two enclosed fluid volumes. The arrangement is such that movement of leftmost wheels of the vehicle in an opposite direction relative to the body of the vehicle than rightmost wheels of the vehicle tends to effect compression of fluid in one of the fluid volumes. This has the effect of restraining movement of the wheels relative to the vehicle body and of resisting roll of the vehicle during cornering. The arrangement is also such that movement of a first set of diagonally opposite wheels in an opposite direction relative to the body of the vehicle than a second set of diagonally opposite wheels tends to circulate fluid in the hydraulic circuit. This has the effect of permitting movement of the wheels relative to the vehicle body, thereby permitting relative motion of transversely adjacent wheels in a cross-axle articulation (or warp) motion.

Although the suspension system operates satisfactorily in passively reducing roll of the vehicle whilst permitting cross-axle articulation, as the temperature adjacent the suspension system varies, the temperature and therefore the volume of fluid in the two fluid volumes also varies. As the expansion of the fluid with temperature increases the volume of fluid within each fluid volume, said fluid volumes must expand to accommodate the excess fluid. There is a usually a limited amount of expansion available due to component resilience, however a high component stiffness is desired for the roll control operation of the system. This high stiffness can cause a significant increase in pressure in the system with temperature. If the pressure becomes too high, friction in seals of the suspension system will become significant and, ultimately, may lead to significant egress of fluid and failure of the suspension system. If the pressure becomes too low, air remaining in the hydraulic circuits becomes significant and the ability of the suspension system to generate a high roll stiffness is reduced.

In addition, during normal operation of the suspension system small amounts of fluid are continually lost through the seals between the piston and the cylinder of each hydraulic ram, this fluid loss also contributing to a reduced system pressure and a consequent reduction in roll stiffness.

Temperature differences and egress of fluid may also lead to the static effect cylinder force changing which can cause differences in left and right handling of the vehicle.

The present invention seeks, among other things, to provide a hydraulic system for a vehicle suspension which overcomes at least one of the above mentioned disadvantages. In accordance with one aspect of the present invention, there is provided a hydraulic system for a vehicle suspension, said hydraulic system being a portion of a roll control component of said vehicle suspension, said hydraulic system including a front hydraulic ram means and a rear hydraulic ram means, the front and rear hydraulic ram means being respectively in the form of a double acting hydraulic ram and including a cylinder portion and piston portion, the piston portion separating the cylinder portion into first and second chambers;

a first fluid line extending, in use, between the first chamber of the front hydraulic ram means and the first chamber of the rear hydraulic ram means, thereby forming a first fluid volume, a second fluid line extending, in use, between the second chamber of the front hydraulic ram means and the second chamber of the rear hydraulic ram means, thereby forming a second fluid volume, at least one accumulator means in fluid communication with at least one said fluid volume, the accumulator means including a sealed gas enclosure and a fluid enclosure in fluid communication with said at least one fluid volume; and fluid flow restricting means adapted to restrict the rate of fluid flow between the fluid enclosure and the corresponding at least one fluid volume such that there is little to negligible change in the volume of the gas enclosure during cornering of the vehicle, the volume of the gas enclosure varying over time for at least substantially equalising the pressure in the fluid volume and the gas enclosure thereby minimising variations in the pressure within the fluid volume.

The hydraulic system may form part of a suspension system as described in International Patent Application WO 97/06971 referred to previously. It is however to be appreciated that the hydraulic system can also be used on other hydraulic vehicle suspension systems utilising interconnected hydraulic ram means.

The hydraulic rams may be of the through rod type where the first and second chambers are respectively provided with the same piston face area such that the pressures in the fluid volumes are generally symmetrical. It is however also possible to use more conventional hydraulic rams having unequal piston areas.

According to one preferred embodiment of the present invention, the accumulator means may be in fluid communication with both fluid volumes. The accumulator means may include an expansion accumulator, and the flow restricting means may be in the form of first and second capillary tubes respectively interconnecting the expansion accumulator with the first and second fluid conduits. Other forms of fluid flow restricting means are however also envisaged.

Preferably, the fluid flow restriction means is adapted to provide enough flow to equalise the pressure difference between the first and second fluid volumes caused by static differences such as temperature differences and leakage, to allow the vehicle to return to a substantially level position from an offset position. The fluid flow restriction means should also be restrictive enough to limit the flow of fluid caused by dynamic pressure differences, such as those generated by the vehicle cornering.

The expansion accumulator may include a cavity separated by a flexible membrane into a gas enclosure and fluid enclosure, the fluid enclosure being in fluid communication with the first and second fluid volumes.

According to another preferred embodiment, the hydraulic system may include a separate accumulator means for each hydraulic volume, the flow restricting means being in the form of a capillary tube interconnecting each accumulator means to a respective said hydraulic volume.

The hydraulic system according to the present invention may further include a valve means located between the or each accumulator means and the hydraulic volumes. In the first described embodiment, the valve means may be provided between the accumulator and the flow restricting means. It is also envisaged that a said valve means be provided between each accumulator and hydraulic volume in the second described embodiment.

In one form, the valve means may be in series with the flow restricting means. In this form, the valve means can be small and is relatively safe in operation, as fluid flow must pass through the fluid flow restricting means before passing through the valve means.

In another form, the valve means may be in parallel to the fluid restricting means. The valve means would preferably be open to allow some pressure equalisation between the volumes and may be closed at other times, including when the vehicle is cornering. The valve means may be subject to high fluid flow, which can lead to undesirable movements in the suspension. Therefore, additional mechanisms may need to be employed to reduce the flow of fluid across the valve means upon opening, such as partially opening the valve means, or including additional flow dampening means.

The valve means may include a solenoid and a valve member reciprocally movable between a closed valve position and an open valve position, the valve member being biased towards the closed position by a resilient means, the actuation of the solenoid effecting movement of the valve member towards the open valve position. The valve means may open to thereby provide fluid communication between the two hydraulic volumes and the accumulator means. The valve means may open periodically or may open as a function of vehicle motion. Sensor means may be provided to sense, for example, cornering of the vehicle such that the valve means is closed during cornering. This provides for low roll stiffness during straight line motion, and a high roll stiffness during roll motion.

The hydraulic system according to the present invention is therefore adapted to take into account changes in fluid volume and pressure due to fluid leakage, change in temperature and so on.

According to another aspect of the present invention, there is provided a roll control component for a vehicle suspension including a hydraulic system according to the present invention.

The roll control component may include a front and rear roll stabiliser bar, each stabiliser bar respectively interconnecting wheel assemblies of the vehicle. The front and rear hydraulic ram means may respectively interconnect the front and rear stabiliser bars to the body of the vehicle. At least the rear stabiliser bar may be pivotally mounted to the vehicle. The front stabiliser bar may be mounted by a drop link to the vehicle body.

It will be convenient to further describe the invention with respect to the accompanying drawings which illustrate preferred embodiments of the present invention. Other preferred embodiments of the invention are possible, and consequently, the particularity of the accompanying drawings is not to be understood as superceding the generality of the preceding description of the invention.

Figure 1:
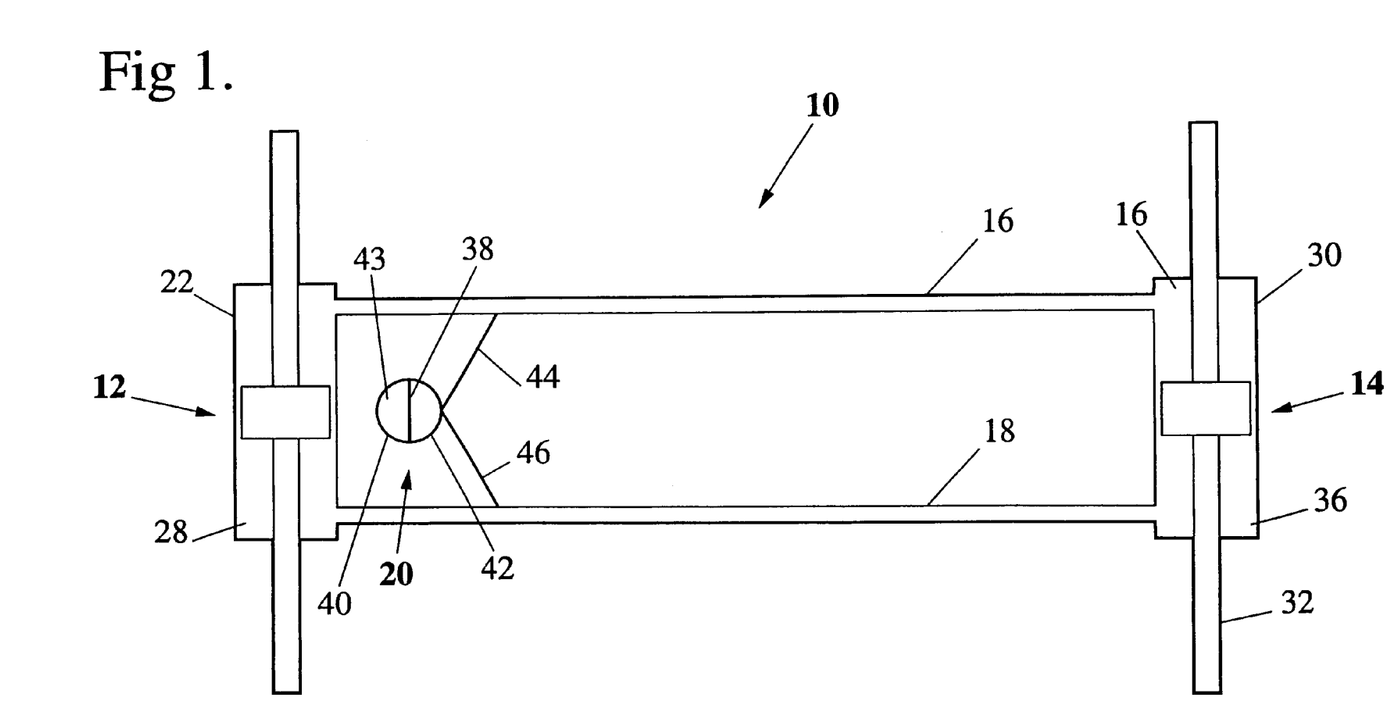
FIG. 1 is a diagrammatic representation of a hydraulic system in accordance with a first embodiment of the present invention.

Referring to the drawings, there is shown in FIG. 1 a first preferred embodiment of a hydraulic system 10 in accordance with the present invention. The hydraulic system 10, in use, forms part of a roll control component of a vehicle suspension (not shown). The hydraulic system 10 includes a front hydraulic ram 12, a rear hydraulic ram 14, a first fluid line 16 extending between the front hydraulic ram 12 and the rear hydraulic ram 14, and a second fluid line 18 extending between the front hydraulic ram 12 and the rear hydraulic ram 14. Accumulator means, in this example in the form of an expansion accumulator 20, is also provided, the accumulator 20 being in fluid communication with both the first fluid line 16 and the second fluid line 18.

The front hydraulic ram 12 is a double acting hydraulic ram and includes a front cylinder portion 22 and a front piston portion 24 slidably received in the front cylinder portion 22 and reciprocally movable relative to the front cylinder portion 22. The front piston portion 24 separates the front cylinder portion 22 into a front first chamber 26 and a front second chamber 28.

The rear hydraulic ram 14 is a double acting hydraulic ram and includes a rear cylinder portion 30 and a rear piston portion 32 slidably received in the rear cylinder portion 30 and reciprocally movable relative to the rear cylinder portion 30. The rear piston portion 32 separates the rear cylinder portion 30 into a rear first chamber 34 and a rear second chamber 36.

The front and rear hydraulic rams 12, 14 are through-rod type double-acting rams. It will be understood that since this type of ram is symmetrical and includes chambers of similar configuration and volume, both chambers of the ram are subjected to similar pressures and wear during use and differences in left and right handling are less likely to occur. A similar situation can also be achieved by using a non-symmetrical double acting ram having a piston rod of transverse diameter which is sufficiently small to reduce the effects of differences in pressure across the piston to negligible levels. Other measures can be taken to improve the symmetry of such arrangements such as tuning flexible hose lengths, incorporating springs to react any offset, etc.

The front hydraulic ram 12 is connected to the rear hydraulic ram 14 by the first and second fluid lines 16,18 such that the front first chamber 26 is connected in fluid communication to the rear first chamber 34 by the first fluid line 16 and such that the front second chamber 28 is connected in fluid communication to the rear second chamber 36 by the second fluid line 18.

The configuration of the hydraulic system 10 is such that the front first chamber 26, the rear first chamber 34 and the first fluid line 16 form a first hydraulic volume, and the front second chamber 28, the rear second chamber 36 and the second fluid line 18 form a second hydraulic volume.

The accumulator 20 includes a cavity separated by a flexible membrane 38 into a gas enclosure 40 and a fluid enclosure 42. The gas enclosure 40 is provided with pressurised gas 43.

The accumulator 20 is connected to the first and second fluid lines 16, 18 by fluid flow restricting means. In this example, the fluid flow restricting means is in the form of a first capillary tube 44 in fluid communication with the first fluid line 16, and a second capillary tube 46 in fluid communication with the second fluid line 18. The capillary tubes 44, 46 provide fluid communication between the fluid enclosure 42 and the first and second fluid lines 16, 18.

It will be appreciated that as an alternative to the first and second capillary tubes, the fluid flow restricting means may take the form of a disc having an enclosed spiral groove accommodated on the disc. One end of the groove would be connected to the first fluid volume, the other end of the groove would be connected to the second fluid volume and the accumulator would be connected to a location on the groove substantially equal to half the linear length of the groove. The fluid flow restricting means may include filters (not shown). A further and preferred alternative method is to provide a manifold in the two fluid lines 16, 18 incorporating drillings to connect the two lines together and to the accumulator, the drillings being partially blocked by a high restriction, low flow device such as a very fine restrictor or preferably a porous piece of material. A sintered filter in a larger diameter line has the advantage that it is cheap, has many flow paths so is not so susceptible to blockage, can be manufactured to provide a reliable restriction, and can additionally provide a filtering function. If capillary lines, grooved discs, restrictors or other small diameter single-path restriction devices are used, fine filters are needed to prevent blockage.

However, it will be appreciated that any suitable fluid flow restricting means which restricts the rate of fluid flow is envisaged.

The fluid flow restricting means acts to restrict the rate of fluid flow between the hydraulic fluid lines 16, 18 and the accumulator 20 and thereby prevent the rapid pressure changes in the two fluid volumes (due to the dynamically changing loads in the front and rear hydraulic rams 12, 14) causing the transfer of significant fluid volume between each other or to the accumulator 20, in particular during cornering.

The gas enclosure 40 is charged with pressurised gas 43 to a pressure such that, in use, the volume of gas in the gas enclosure 40 is approximately equal to the volume of fluid in the fluid enclosure 42 under normal operating conditions of the hydraulic system 10.

The hydraulic system 10 may be incorporated into a vehicle suspension, in use, as a portion of a roll control component of the vehicle suspension such that the front piston portion 24 is operatively associated with, for example, a front left wheel of the vehicle, the front cylinder portion 22 is operatively associated with, for example, a front right wheel of the vehicle, the rear piston portion 32 is operatively associated with, for example, a rear left wheel of the vehicle, and the rear cylinder portion 30 is operatively associated with, for example, a rear right wheel of the vehicle.

The roll control component of the vehicle suspension operates such that, when the vehicle travels around a corner and the vehicle experiences forces which tend to effect roll of the vehicle, the front and rear piston portions 24, 32 are urged to travel in the same direction relative to their respective front and rear cylinder portions 22, 30, and the front and rear piston portions 24, 32 tend to compress or expand fluid in the first and second hydraulic volumes. As a result, the respective fluid pressures generated by the front and rear piston portions 24, 32 are substantially equalised or balanced and simultaneous movement of the front and rear piston portions 24, 32 in the same direction relative to their respective front and rear cylinder portions 22, 30 is restrained due to an effective "hydraulic lock". When the vehicle travels in a straight line across uneven terrain which tends to urge the front left and rear left wheels of the vehicle to move in opposite directions, the front and rear piston heads 25, 33 act to move fluid through the first and second fluid conduits and the front and rear piston portions 24, 32 are permitted to move simultaneously in opposite directions relative to their respective cylinder portions 22, 30 substantially free of restraint. This arrangement, therefore, provides passive control which acts to cause the vehicle suspension to resist roll of the vehicle and simultaneously permit cross-axle articulation.

When the vehicle is at rest, the pressures in the respective first and second hydraulic volumes are such that the behaviour of the vehicle suspension is substantially the same for left and right handling.

However, the pressure in each of the first and second hydraulic volumes is sensitive to temperature. An increase in temperature effects an increase in pressure, which without pressure compensation may cause stress in the hydraulic system 10 and possibly mechanical failure. A decrease in temperature effects a decrease in pressure and, without pressure compensation, a corresponding reduction in the ability of the hydraulic system 10 to resist roll of the vehicle. In addition, without pressure compensation, if one of the hydraulic volumes is affected by a temperature change but the other is not or is less affected, differences in left and right handling of the vehicle may occur and/or the vehicle may adopt a lean.

Pressure changes also occur in the first and second hydraulic volumes due to continual egress of small amounts of fluid, primarily across the rod and piston seals, ie past seals between the front and rear piston portions 24, 32 and the respective front and rear cylinder portions 22, 30. Such loss of fluid volume and consequent pressure change in the hydraulic volumes also has a similar effect on the behaviour of the hydraulic system as a decrease in temperature as described above, albeit to only a limited extent over very long time periods.

With the hydraulic system 10 in accordance with the present invention, if the pressure increases in one (or both) of the hydraulic volumes, for example because of an increase in temperature, a differential pressure is created between the respective first and/or second hydraulic volume (s) and the gas enclosure 40 of the accumulator 20. As a result, fluid is caused to flow along the respective first and/or second capillary tube(s) 44, 46 towards the fluid enclosure 42. This occurs until the pressure in the hydraulic volumes has decreased to a level equal to the pressure in the gas enclosure 40.

If the pressure in one (or both) of the hydraulic volumes decreases, for example because of a reduction in temperature or a loss of fluid from the hydraulic system 10, the reverse occurs; that is, a differential pressure is created between the gas enclosure 40 of the accumulator 20 and the respective first and/or second hydraulic volume(s) which causes fluid to flow along the respective first and/or second capillary tube(s) 44, 46 away from the fluid enclosure 42 until the pressure in the hydraulic volumes has increased to a level equal to the pressure in the gas enclosure 40.

It will be understood, therefore, that the hydraulic system 10 operates so as to provide compensation for an increase or decrease in pressure in the first and second hydraulic volumes and thereby maintain the pressure in the hydraulic circuit substantially constant.

It will also be understood that the first and second capillary tubes 44, 46 provide a pressure equalisation path for fluid to flow between the first and second hydraulic volumes when the steady state pressure in one of the hydraulic volumes exceeds the pressure in the other hydraulic volume.

It will also be understood that during cornering a pressure differential is created between the first and second hydraulic volumes, which tends to urge fluid to move from the relatively high pressure hydraulic volume to the relatively low pressure hydraulic volume. This has the undesirable effect of increasing the roll angle of the vehicle. However, to minimise this the fluid flow restricting means is configured such that the permitted rate of fluid flow is relatively low and the amount of fluid transferred between the first and second hydraulic volumes during cornering is negligible.

It will be appreciated that the volume of fluid in the fluid enclosure 42 of the accumulator 20 should be sufficiently large to compensate for pressure changes corresponding to all expected temperature changes and leakages during use of the hydraulic system 10.

Figure 2:
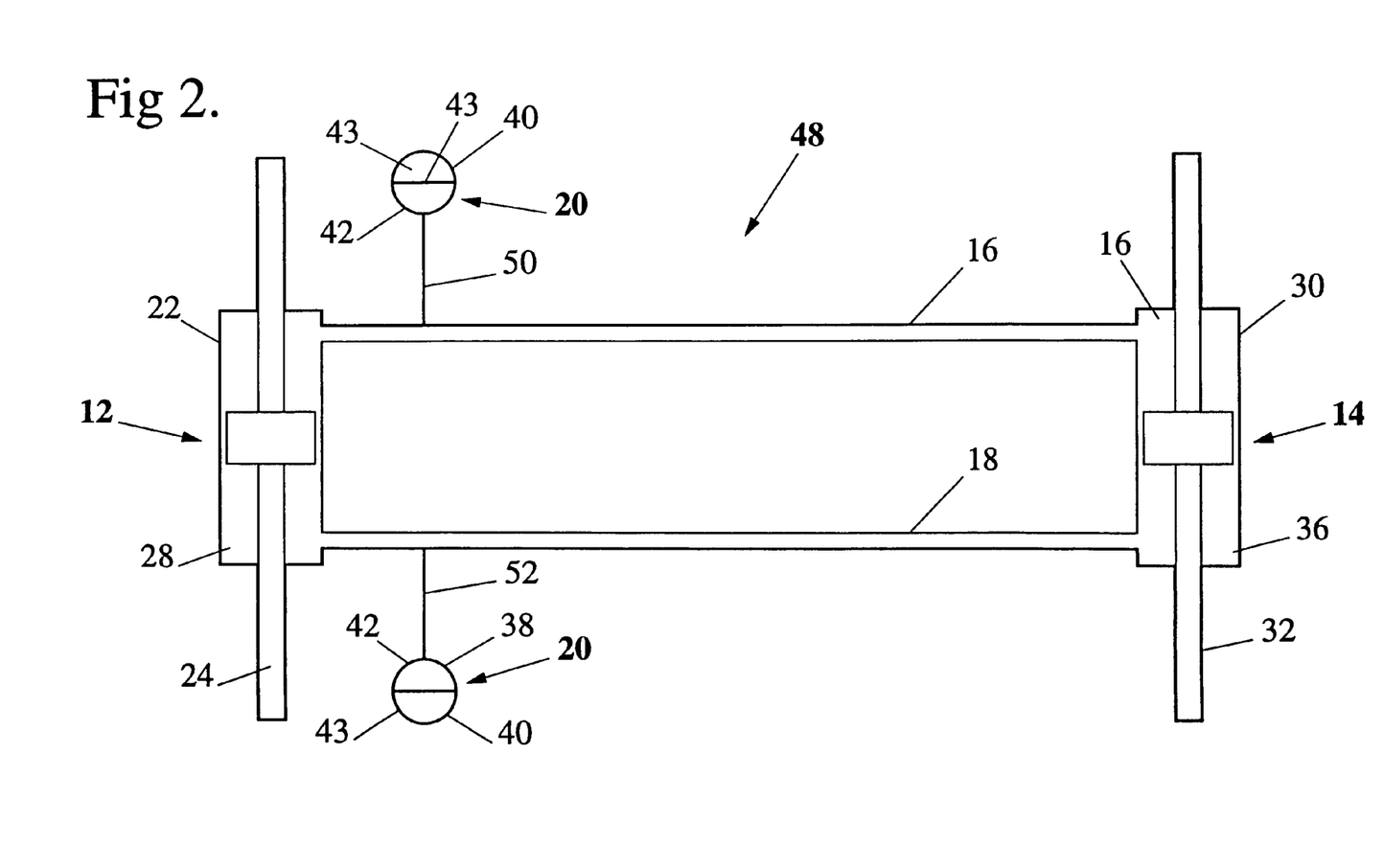
FIG. 2 is a diagrammatic representation of a hydraulic system in accordance with a second embodiment of the present invention.

An alternative hydraulic system 48 in accordance with a second preferred embodiment of the present invention is shown in FIG. 2. Like features are indicated with like reference numerals.

In this embodiment, an accumulator 20 is provided for each hydraulic volume, one of the accumulators 20 being connected to the first fluid line 16 by a first fluid flow restricting means, in this example a first capillary tube 50, and the other accumulator 20 being connected to the second fluid line 18 by a second fluid flow restricting means, in this example a second capillary tube 52. The fluid flow restricting means may take other forms as described with respect to FIG. 1.

Operation of the hydraulic system 48 is essentially the same as operation of the hydraulic system 10 in that pressure increases or decreases in each hydraulic volume are compensated by an accumulator 20. However, it will be understood that in this embodiment the hydraulic volumes are not interconnected by the fluid flow restricting means and, as such, pressure variations in each hydraulic volume are compensated only by the respective accumulator 20 associated with the hydraulic volume.

It will also be understood that, unlike the hydraulic system 10 shown in FIG. 1, there is no pressure equalisation path for maintaining equal steady state pressure between the two hydraulic volumes and, therefore, with this hydraulic system there is a possibility that differences in left and right handling may occur over time. However, this is unlikely, as the stiffness provided by the accumulators is so low that the pressure difference from one fluid volume to the other will be low even after considerable uneven leakage has occurred.

It will be appreciated, however, that since the hydraulic volumes are not interconnected, with this arrangement it is possible to use a conventional double acting ram and charge the first and second hydraulic volumes and associated accumulators to different pressures so as to compensate for differences in configuration and in the actual volume of the first and second chambers of the front and rear hydraulic rams 12, 14.

Figure 3:
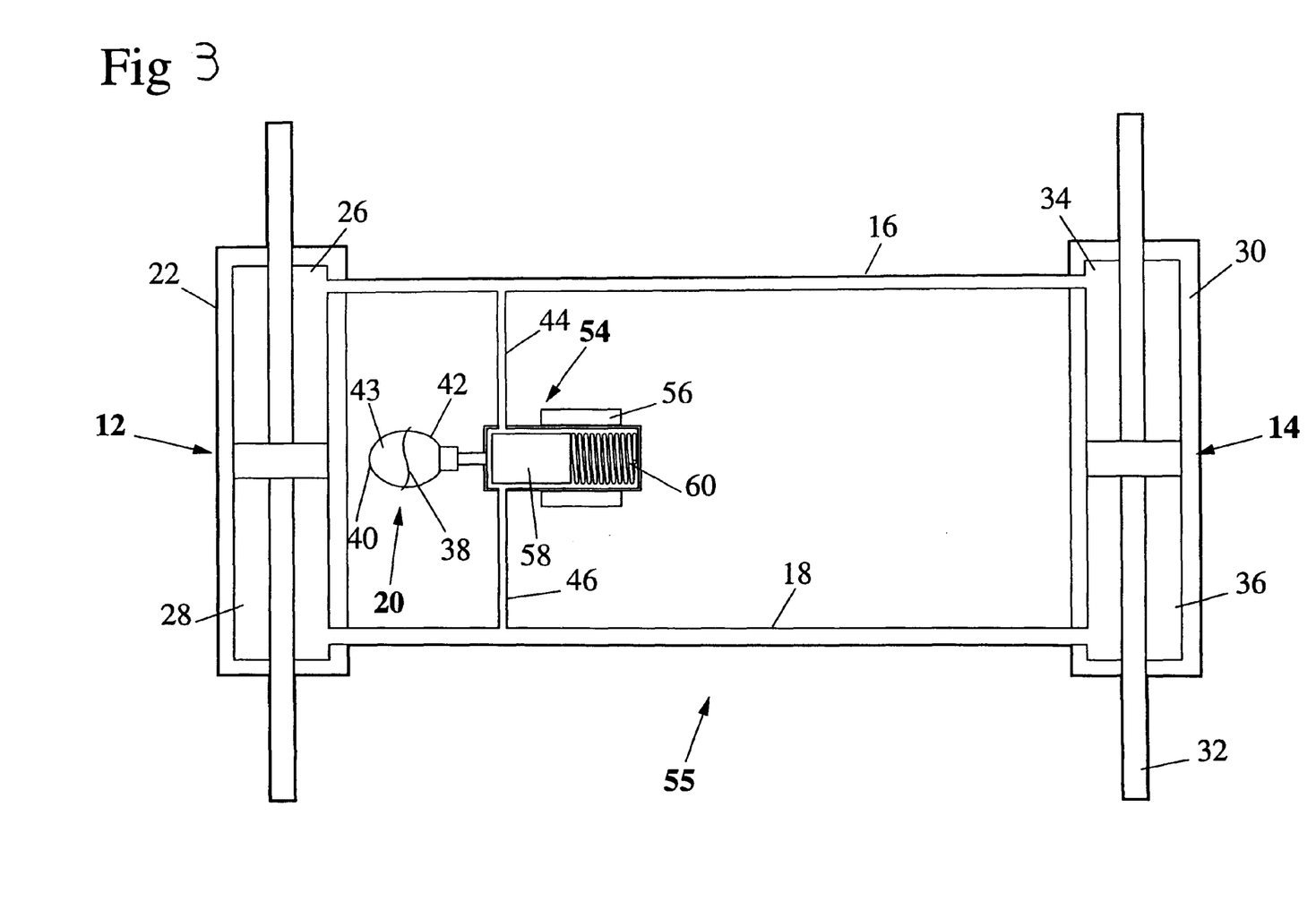
FIG. 3 is a diagrammatic representation of the first embodiment of the invention shown in FIG. 1 with the hydraulic system provided with valve means.

In FIG. 3, there is shown a further alternative hydraulic system 55 similar to the hydraulic system 10 shown in FIG. 1. Like features are indicated with like reference numerals.

The hydraulic system 55 is provided with valve means 54. The valve means 54 is disposed between the first and second capillary tubes 44, 46 and the accumulator 20. The valve means operates so as to selectively open or close the fluid communication path between the first capillary tube 44, the second capillary tubes 46 and the fluid enclosure 42 of the accumulator 20.

The valve means 54 includes a solenoid 56 and a valve member 58 reciprocally movable between a closed valve position and an open valve position. The valve member is biased towards the closed valve position by a spring 60. The arrangement is such that actuation of the solenoid 56 effects movement of the valve member 58 towards the open valve position.

In normal operation of the hydraulic circuit 10, the valve member 58 is urged towards the closed position by the spring 60 and fluid flow between the first capillary tube 44, the second capillary tube 46 and the accumulator 20 is prevented. In this valve position, pressure compensation does not occur. Actuation of the solenoid 56 causes the valve member 58 to move to the open valve position, and the first capillary tube 44, the second capillary tube 46 and the accumulator 20 to connect in fluid communication with each other. In this valve position, therefore, pressure compensation as described in relation to the hydraulic system 10 of FIG. 1 occurs.

It will be appreciated that by providing the valve means 54, the hydraulic system is provided with pressure compensation which may be activated or deactivated as desired. Preferably, in use, the valve means is opened periodically, for example every minute, for a short period of time, for example 1 ms. In this way, gradual equalisation of pressure in the hydraulic system is achieved whilst minimising fluid transfer during cornering. Alternatively, opening and closing of the valve means may be controlled by sensing means which generates a signal during cornering and effects actuation of the solenoid in response to the signal. The valve means may also open for an extended period of time on initial start-up of the vehicle so as to effect initial pressure compensation in the hydraulic system.

Furthermore, in situations where a very low straight line roll stiffness is desired, the first and second capillary tubes 44, 46 may be replaced with standard conduits and the valve means 54 controlled so as to open during straight line movement and close during cornering. In this way, a low roll stiffness with pressure compensation is achieved during straight line movement, and a high roll stiffness is achieved during cornering. Actuation of the valve means 54 may be by any suitable sensing of cornering of the vehicle, for example by sensing steering rate of change, lateral acceleration, or steering angle. Furthermore, the opening of the valve means may be gradual, using pulse width modulation for example, to prevent noise and sudden motions of the vehicle when the valve is opened with a pressure differential between any of its three ports, ie the two conduits and the accumulator.

The fluid flow restricting means should also be able to operate effectively at very low operating temperatures, such as −40 degrees Celsius, where the fluid may become much more viscous than at 20 degrees or even 100 degrees Celsius, which may be experienced in some conditions. However, the fluid flow through the flow restricting means should also not be so high as to allow the vehicle to roll when cornering. Accordingly, combining the valve and the fluid flow means in the embodiments discussed above provides an advantage in that the rate of fluid flow can be controlled across a range of conditions such as temperature. When used in series, the small valve may be used to prevent fluid flow between the volumes during cornering. When used in parallel, the valve, when closed, may provide a reduced roll stiffness at times when this is desirable, and when open, may provide a high roll stiffness when cornering.

In another embodiment (not shown) the fluid flow restriction means may include a restriction which is temperature dependant, i.e. there may be less restriction at lower temperatures than at higher temperatures, to facilitate a more even restriction to fluid flow across a range of temperatures.

In another embodiment, (not shown) the valve 20 may be connected in parallel with the first and second capillary tubes 44 and 46. That is, the valve may be selectively open and close a conduit connecting the first hydraulic volume 44 to the second hydraulic volume 44. In this way, a fluid flow restricting means having a high restriction to fluid flow can be used, allowing some fluid flow to reduce the pressure differential between volumes, while providing a high roll stiffness. When a very low roll stiffness is required, the valve may be opened to allow for greater fluid flow than that allowed for by the fluid flow restriction means alone.

Figure 4:
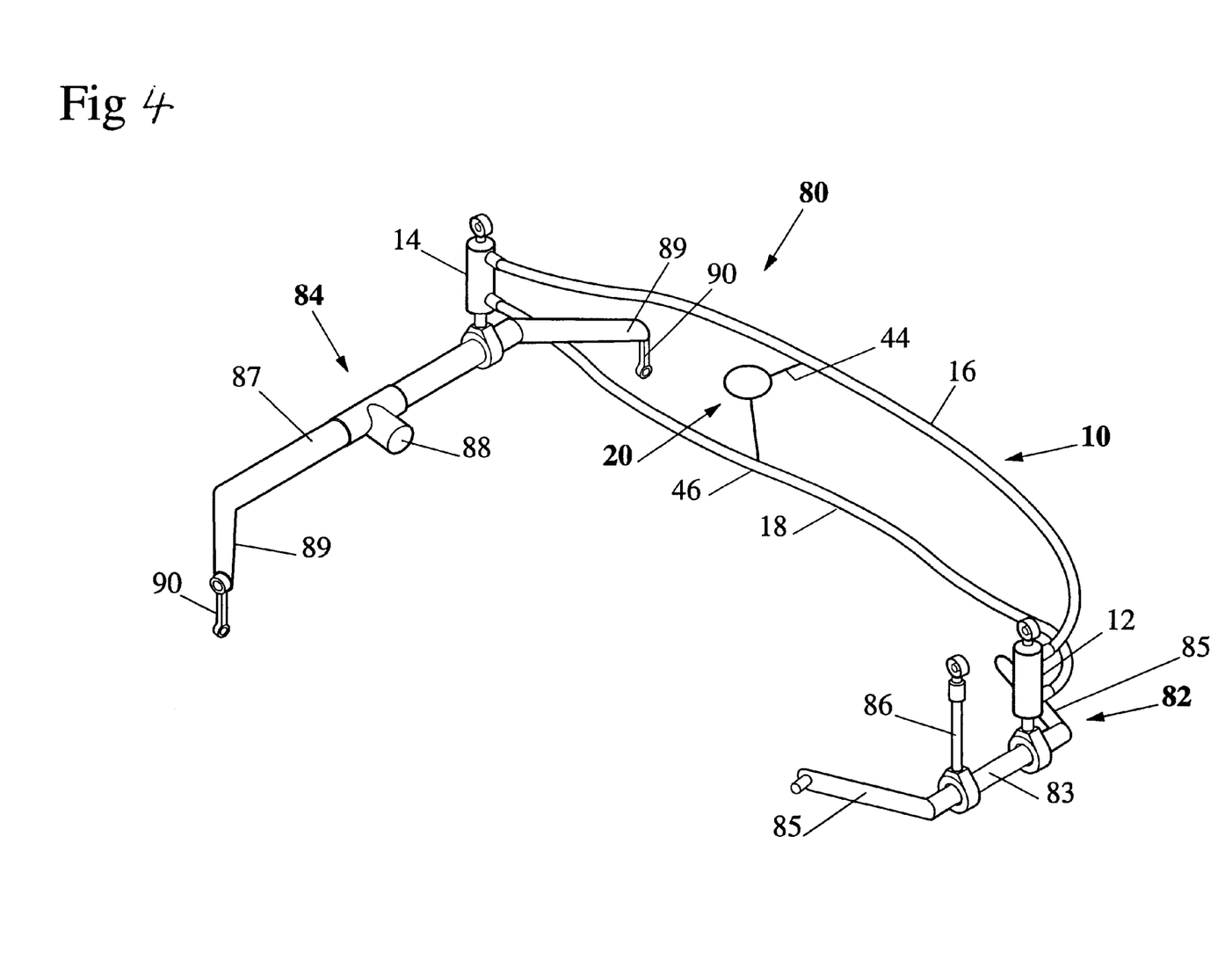
FIG. 4 is a diagrammatic representation of a roll control component of a vehicle suspension according to the present invention.

FIG. 4 shows the roll control component 80 of a vehicle suspension incorporating a hydraulic system similar to that shown in FIG. 1 and the features are indicated with like reference numerals. The roll control component is of the type previously described in WO 97/06971, and incorporates a front roll stabiliser bar 82 and rear stabiliser bar 84 respectively associated with the front and rear wheel assemblies (not shown) of a vehicle. The front stabiliser bar 82 is shaped to be accommodated under an existing vehicle body and the shape will vary depending on the vehicle body configuration. In the illustrated arrangement, the front roll stabiliser bar 82 includes a relatively short central portion 83 and arm portions 85 extending rearwardly and angled away from the centre of the vehicle. The arm portions 85 are respectively interconnected with a wheel assembly (not shown) of the vehicle. The front stabiliser bar 82 is mounted to the vehicle body by a drop link 86 pivotally connected to the central portion 83 and a hydraulic ram 12 of the hydraulic system 10, also pivotally supported to the central portion 83.

The rear stabiliser bar 84 also comprises a central portion 87 having opposing relatively short arm members 89 at opposing ends thereof. These arm portions 89 are respectively interconnected by link members 90 to respective rear wheel assemblies (not shown). The rear stabiliser bar is supported on a pivot stub axle 88 located at the middle of the central portion 87 thereof. This stub axle 88 is supported within a pivot point (not shown) located on the vehicle body. The rear stabiliser bar 84 is also mounted to the vehicle body by the rear hydraulic ram 14 of the hydraulic system 10.

The pivot connection of the rear roll stabiliser has 84 reduces the required arcuate displacement of the rear stabiliser bar 84 required for the roll control component to operate properly. This makes it easier to package the roll control component under a vehicle.

The front and rear hydraulic rams 12, 14 are interconnected by first and second fluid lines 16, 18 with an accumulator 20 being connected to each fluid line by capillary lines 44, 46 in the same way as shown in FIG. 1. The accumulator therefore acts to provide pressure compensation for the hydraulic system as required.

Modifications and variations as would be apparent to a skilled addressee are deemed to be within the ambit of the present invention as defined in the appended claims.

What is claimed is:

1. A hydraulic system for a vehicle suspension, said hydraulic system being a portion of a roll control component of said vehicle suspension, said hydraulic system including
   a front hydraulic ram means and a rear hydraulic ram means, the front and rear hydraulic ram means being respectively in the form of a double acting hydraulic ram and including a cylinder portion and piston portion, the piston portion separating the cylinder portion into first and second chambers;
   a first fluid line extending, in use, between the first chamber of the front hydraulic ram means and the first chamber of the rear hydraulic ram means, thereby forming a first fluid volume,
   a second fluid line extending, in use, between the second chamber of the front hydraulic ram means and the second chamber of the rear hydraulic ram means, thereby forming a second fluid volume,
   at least one accumulator means in fluid communication with at least one said fluid volume, the accumulator means including a sealed gas enclosure and a fluid enclosure in fluid communication with said at least one fluid volume; and
   fluid flow restricting means adapted to restrict the rate of fluid flow between the fluid enclosure and the corresponding at least one fluid volume such that there is little to negligible change in the volume of the gas enclosure during cornering of the vehicle, the volume of the gas enclosure varying over time for at least substantially equalising the pressure in the fluid volume and the gas enclosure thereby minimizing variations in the pressure within the fluid volume.

2. A hydraulic system according to claim 1, wherein the hydraulic rams are of the through rod type.

3. A hydraulic system according to claim 1, wherein the accumulator means includes an expansion accumulator, and the flow restricting means respectively interconnects the expansion accumulator with the first and second fluid lines.

4. A hydraulic system according to claim 3, wherein the expansion accumulator includes a cavity separated by a flexible membrane into the gas enclosure and the fluid enclosure, the fluid enclosure being in fluid communication with the first and second fluid lines.

5. A hydraulic system according to claim 1, wherein the accumulator means is in fluid communication with both fluid volumes.

6. A hydraulic system according to claim 1, wherein the hydraulic system includes a separate accumulator means for each fluid volume.

7. A hydraulic system according to claim 1, wherein the flow restricting means is in the form of a capillary tube interconnecting each accumulator means to a respective said fluid volume.

8. A hydraulic system according to claim 1, further including a valve means located between the at least one accumulator means and the fluid volumes.

9. A hydraulic system according to claim 8, wherein the valve means includes a solenoid and a valve member reciprocally movable between a closed valve position and an open valve position, the valve member being biased towards the closed position by a resilient means, the actuation of the solenoid effecting movement of the valve member towards the open valve position, wherein the valve means is opened to thereby provide fluid communication between the fluid volumes and the accumulator means.

10. A hydraulic system according to claim 9, further including sensor means for sensing cornering of the vehicle such that the valve means is closed during cornering.

11. A roll control component for a vehicle suspension including a hydraulic system according to claim 1, wherein the roll control component includes a front and rear roll stabiliser bar, each stabiliser bar respectively interconnecting wheel assemblies of the vehicle, the front and rear hydraulic ram means respectively interconnecting the front and rear stabiliser bars to the body of the vehicle.

12. A roll control component according to claim 11, wherein at least one of said roll stabiliser bars is pivotally mounted to the vehicle at a pivot point laterally spaced along the bar from an interconnection point of the hydraulic ram to the bar, the pivot point being arranged to permit rotation of the bar about both a lateral and a longitudinal axis of the vehicle (while substantially preventing translation of the bar pivot point in any direction), the rotation of the bar about the longitudinal vehicle axis being determined by the displacement of the hydraulic ram means (between said bar and the body of the vehicle).

13. A roll control component according to claim 12, wherein at least one of said roll stabiliser bars is mounted by a drop link to the vehicle body.

* * * * *